Aug. 10, 1965  S. CSIMMA  3,199,559
FRUIT TRIMMER
Filed Sept. 26, 1960  5 Sheets-Sheet 5
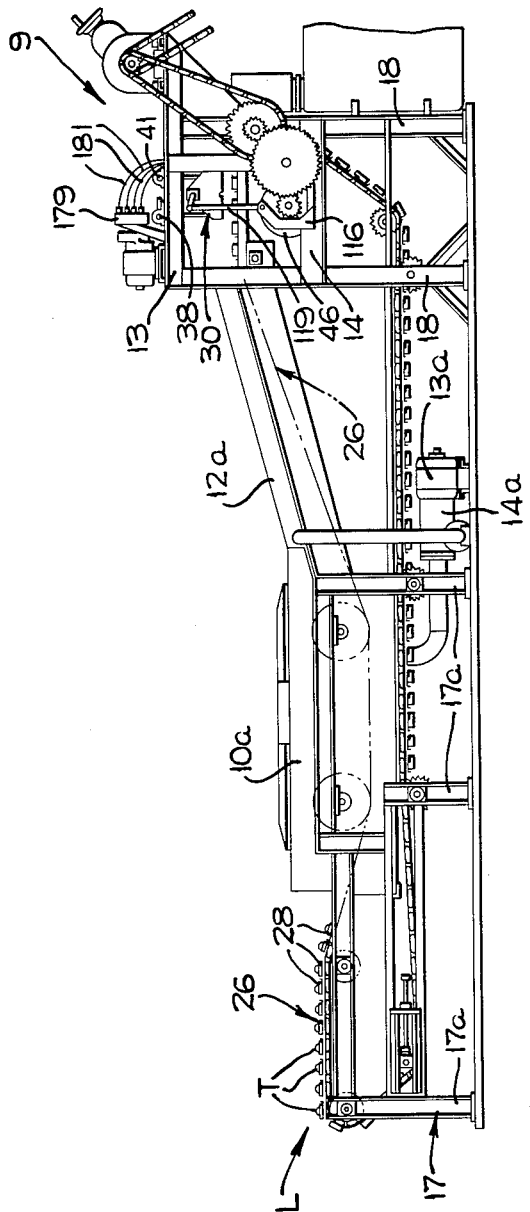
INVENTOR
SANDOR CSIMMA
BY Hans G. Hoffmeister
ATTORNEY United States Patent Office 3,199,559
Patented Aug. 10, 1965

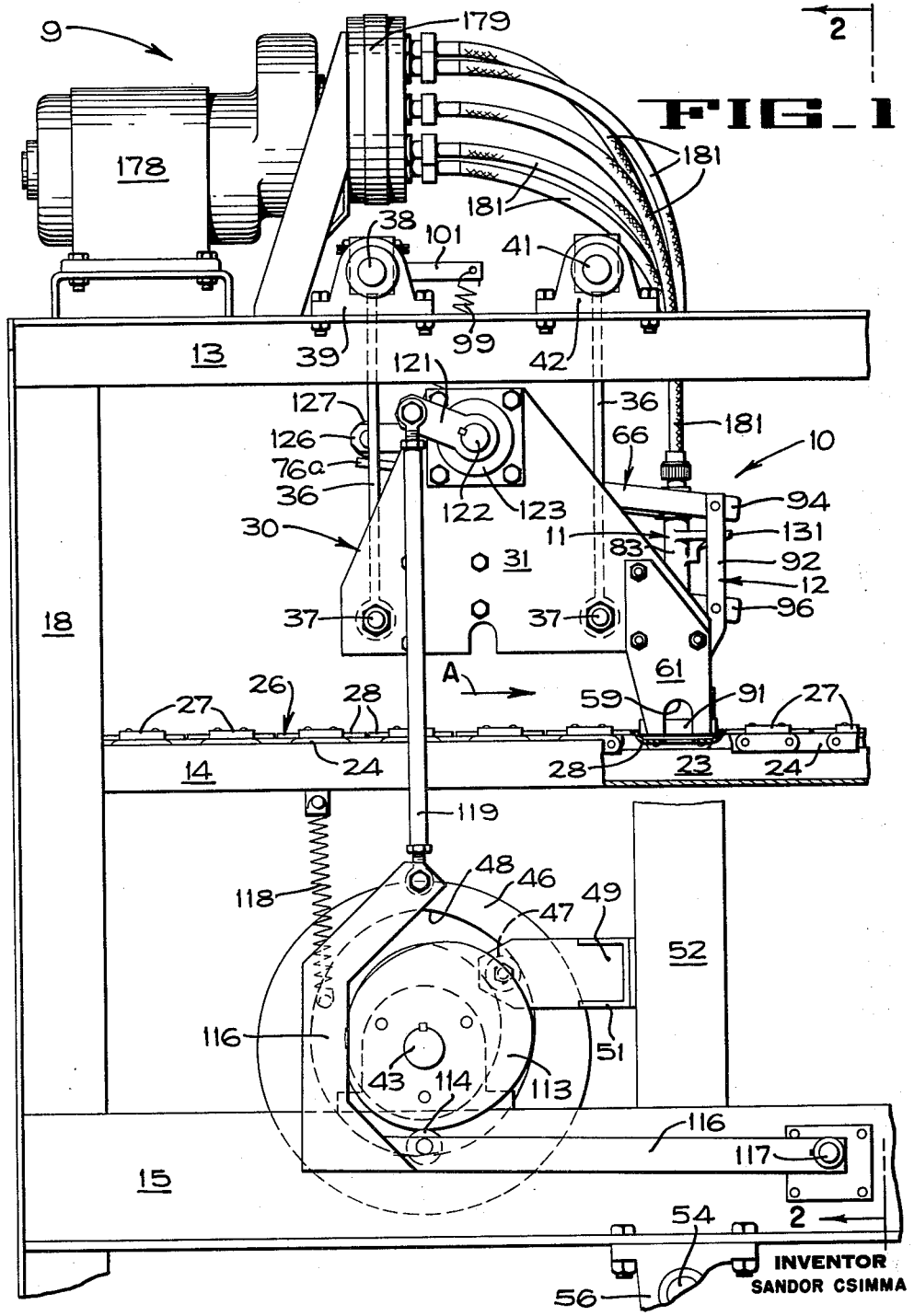

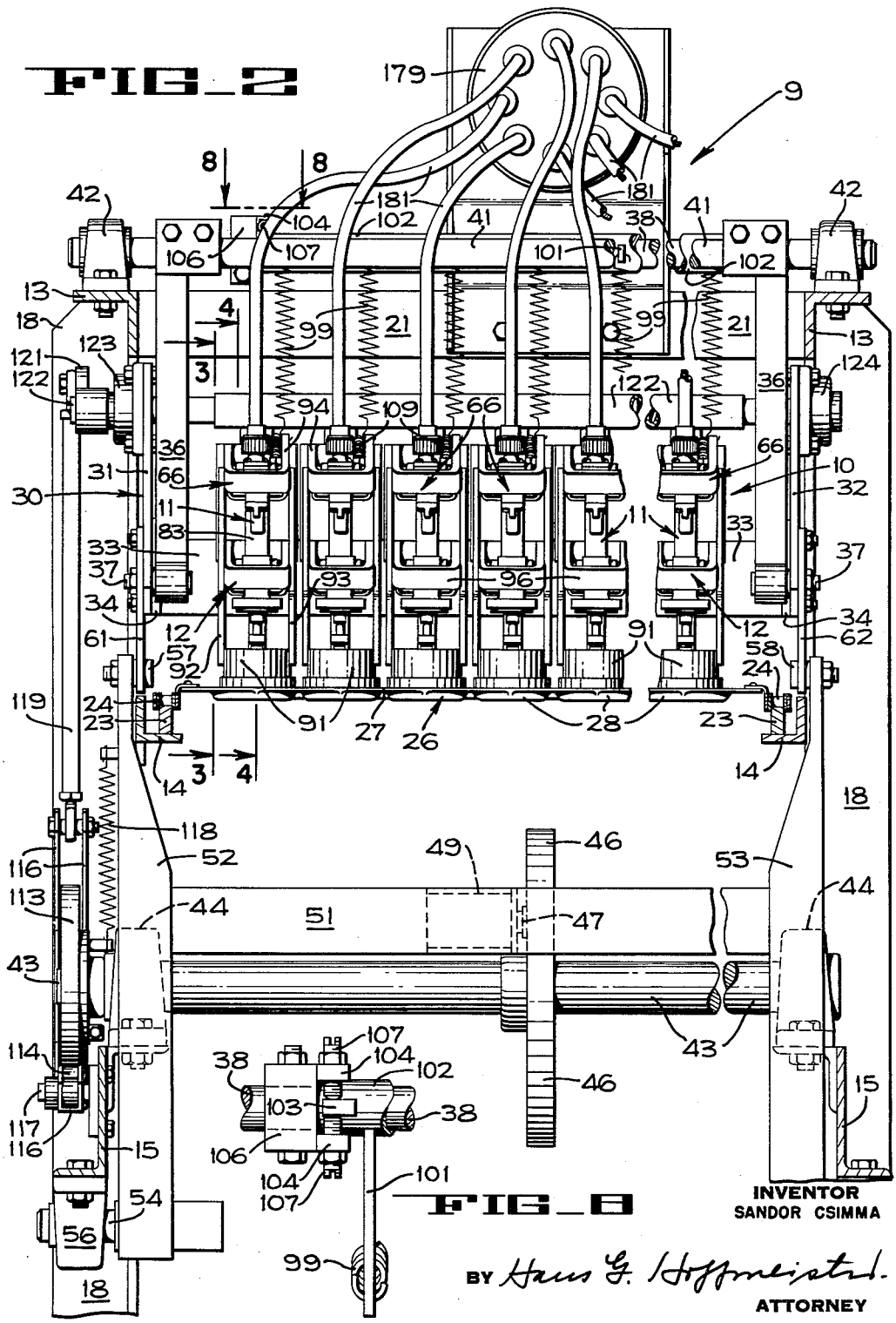

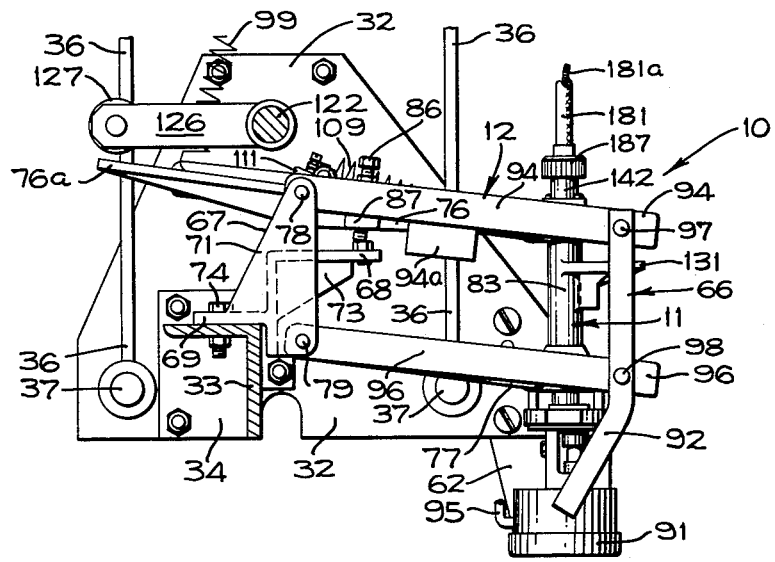
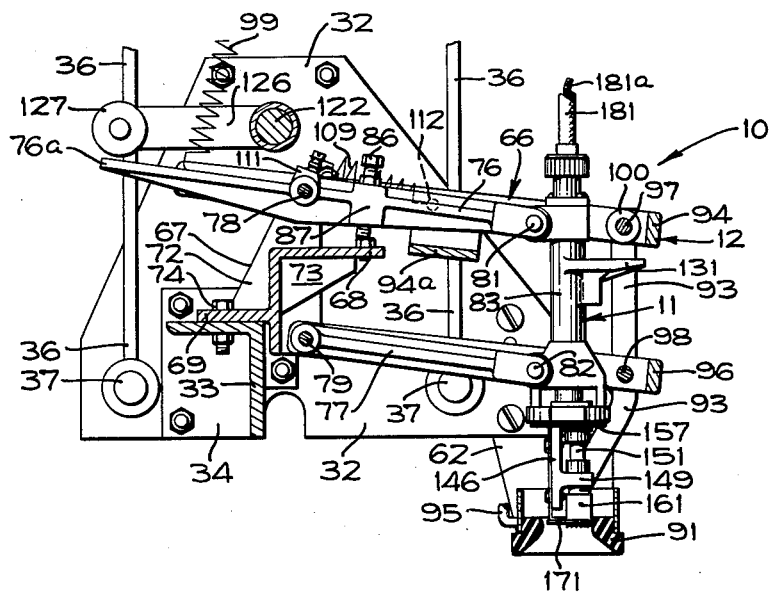

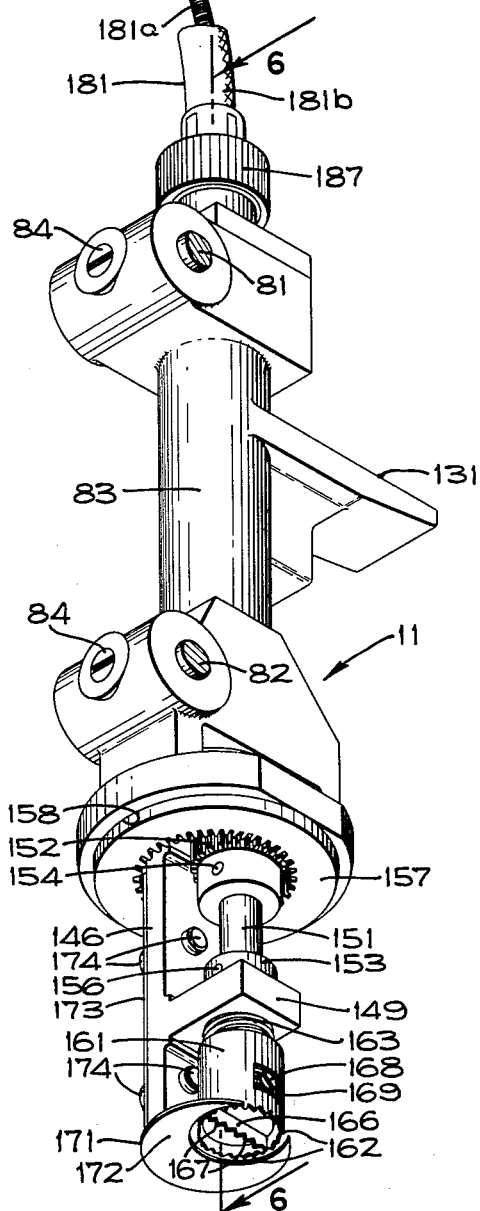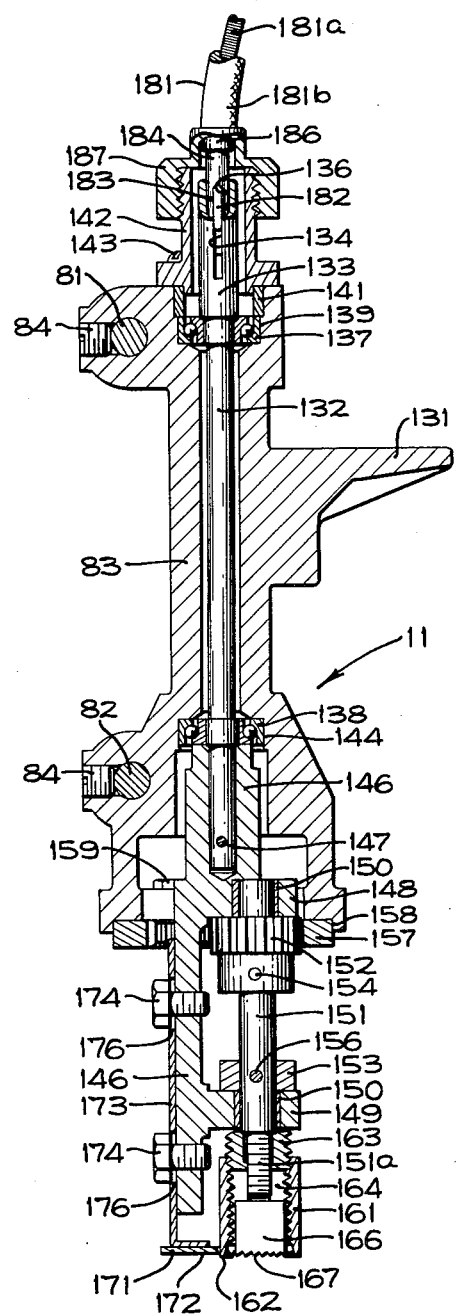

3,199,559
FRUIT TRIMMER
Sandor Csimma, Sunnyvale, Calif., assignor to FMC Corporation, a corporation of Delaware
Filed Sept. 26, 1960, Ser. No. 58,256
10 Claims. (Cl. 146—81)

The present invention pertains to fruit processing apparatus and more particularly relates to a fruit trimming mechanism for trimming the blossom end of fruit such as tomatoes.

The blossom scar on tomates frequently become discolored due to spoilage organisms therein. These discolored blossom scars, which are generally dark brown or black, must be removed from the tomatoes before the tomatoes are canned to prevent spreading of the spoilage organisms and to provide a clean pack without objectionable discoloration therein.

Heretofore, the usual mechanism for removing the scar has been a cutter mounted on a shaft for rotation about the axis of the shaft. When using this type of cutter, it has been found that skin particles clog the cutter near its center since the cutting speed in this area is very low and the small amount of centrifugal force acting on the cut particles in this area is not sufficient to dislodge them from the cutter. Furthermore, the slow speed of the cutter adjacent the axis of rotation results in poor trimming of the fruit. Another disadvantage of this type of device is that the cutter frequently does not encompass an area large enough to trim the blossom scar from fruit when the scar is out of alignment with the fruit's stem axis which extends perpendicular to the face of the stem end of the fruit.

It is, therefore, one object of the present invention to provide an improved fruit trimming mechanism.

Another object is to provide a fruit trimmer operable over a relatively wide area of the blossom end of the fruit.

Another object is to provide improved mechanism for actuating a fruit trimmer.

These and other objects and advantages of the present invention will become apparent from the following description and the accompanying drawings, in which:

FIG. 1 is a side elevation of a portion of a fruit processing apparatus incorporating the fruit trimming mechanism of the present invention.

FIG. 2 is a vertical secton taken along lines 2—2 of FIG. 1 and showing a series of fruit trimming mechanisms in side by side relation, certain parts being broken away.

FIG. 3 is a section taken along lines 3—3 of FIG. 2.

FIG. 4 is a section taken along lines 4—4 of FIG. 2.

FIG. 5 is an enlarged perspective of the fruit trimmer.

FIG. 6 is a central section of the fruit trimmer taken along lines 6—6 of FIG. 5.

FIG. 7 is a diagrammatic plan illustrating the path of movement of the cutters of the fruit trimmer.

FIG. 8 is a plan taken in the direction indicated by the arrows 8—8 in FIG. 2.

FIG. 9 is a side elevation of the conveying system and the lye bath associated with the fruit trimmer.

The fruit processing apparatus 9 (FIGS. 1 and 2) with which the fruit trimming mechanism 10 of the present invention is associated may include an elongated support structure 17 (FIG. 9) on which is mounted a continuously driven conveyor 26 having an upper run, moving toward the processing apparatus 9, which carries the tomatoes T in cups 28. At a loading station L a tomato is placed in each cup with its stem end facing downwardly. As the tomato is carried toward the right, it passes into a tank 10a in which it is treated for a predetermined time in a solution of lye. After leaving the lye tank 10a, the tomato is carried upwardly inside an inclined housing 12a in which excess lye is drained from the tomato and the tomato is exposed to a steam atmosphere for a period of time during which the lye on the skin penetrates to the desired depth to effect loosening of the skin from the flesh of the tomato body. The steam atmosphere in the housing 12a also raises the temperature of the tomato skin to a predetermined optimum peeling temperature. After leaving the housing 12a, the tomato is removed to the processing apparatus 9.

The support frame 17 is a welded structure comprising a series of vertical transversely aligned channels 17a that are interconnected by longitudinal and transverse braces in a conventional manner.

A pump 14a driven by a motor 13a supplies lye to a distributing system (not shown) and the lye is maintained at the desired temperature by conventional steam coils and the vapor from the solution fills the housing 12a.

For a more detailed description of the structure shown in FIGURE 9 reference should be had to the application of Creed et al. Serial Number 695,078 filed November 7, 1957, and which is now abandoned.

The fruit trimming mechanism 10 is mounted on the processing apparatus 9 which comprises a rigid frame that includes pairs of horizontal, longitudinally extending angle bars 13, 14, and 15 secured to vertical bars 18 and to a horizontal transverse member 21. Conveyor guide bars 23 are secured to the angle bars 14 (FIG. 2) and serve to guide two, spaced, endless chains 24 of a continuously driven conveyor 26 thereover. Transversely extending flights 27 are secured to and extend between corresponding links on the spaced chains 24. The plurality of cups 28, carried by the flights 27, are adapted to receive fruit, which will hereinafter be referred to as tomatoes, stem end down. The cups of adjacent flights are aligned longitudinally. The tomatoes are centered relative to their supporting cups 28 by means not shown, before being acted upon by the fruit trimming mechanism 10 of the present invention.

The several fruit trimmers 11, one being associated with each longitudinally extending line of cups 28, are supported in a reciprocable carrier 30 (FIG. 1) of the mechanism 10. The carrier 30 comprises opposed, substantially triangular end plates 31 and 32 held in transversely spaced relation by an angle member 33 which has connecting plates 34 welded to each end thereof. The plates 34 are bolted to the associated triangular end plates 31 and 32. The carrier 30 is suspended for swinging movement from the horizontal bars 13 of the frame by four links 36. Pivot bolts 37 are used to connect two of the links 36 to the end plate 31 and to connect the other two links 36 to the end plate 32. The upper ends of the forward links 36 are rigidly secured to a transverse shaft 38 which is journalled in bearings 39 (one only being shown) bolted to the horizontal bars 13. Similarly, the rear links 36 are rigidly secured to a transverse shaft 41 which is journalled in bearings 42 bolted to the horizontal bars 13.

The conveyor 26 is continuously driven in the direction of the arrow A (FIG. 1) and it will be understood that the reciprocable carrier 30 must be moved at the same speed as the conveyor 26 during the trimming operation on the blossom end of the tomatoes advanced on the conveyor. For this purpose, a cam shaft 43 is provided that is driven in timed relation with the conveyor 26 by any suitable drive means (not shown) as for example a gear mechanism connected between shaft 43 and a shaft that drives conveyor 26. The cam shaft 43 is journalled in bearings 44 bolted to brackets connected to the horizontal bars 15 and has a cam 46 rigidly secured thereto adjacent its center as shown in FIG. 2. A cam follower 47 is received in a cam groove 48 (FIG. 1) in the cam 46 and is mounted for rotation on an arm 49 which is welded to a transversely extending channel member 51. The channel member 51 is rigidly secured to two vertically extending rocker arms 52 and 53 each of which is secured at its lower end to a stub shaft 54 (only one being shown in FIG. 2). Each of the stub shafts 54 is journalled in a bearing 56 (only one being shown) bolted to one of the horizontal bars 15. Rollers 57 and 58 are mounted for rotation on the upper ends of the rocker arms 52 and 53, respectively, and are received in slots 59 (FIG. 1) in drive plates 61 and 62 that are bolted to the triangular end plates 31 and 32, respectively. Thus, rotation of the cam shaft 43 causes reciprocable forward and rearward movement of the carrier 30 with a portion of the rearward movement thereof being at the same speed as the speed of the conveyor 26.

The support mechanism 12 includes a series of side-by-side swingable trimmer support units 66 (FIG. 3) each of which is adapted to support one of the trimmers 11 for vertical movement on the carrier 30. Since all of the swingable units 66 of the several mechanisms 12 are identical, the description of one will suffice for all. Each unit 66 is mounted on a bracket 67 (FIGS. 3 and 4) which includes a transverse angle member 68 that carries a tongue 69 and is enclosed at each side by parallel vertically extending, spaced side plates or arms 71 and 72. The angle member 68 is stiffened by a gusset 73 and the entire bracket 67 is rigidly secured to the angle member 33 by bolts 74 which extend through the tongue 69 and the angle member 33. A pair of parallel links 76 and 77 (FIG. 4) of the swingable unit 66 are pivotally supported by pins 78 and 79, respectively, which extend between and are connected to the arms 71 and 72. The other ends of the links 76 and 77 are in the form of yokes which are pivotally connected to pins 81 and 82, respectively, that are secured to the body 83 of the fruit trimmer 11 by set screws 84 (FIG. 5). A cap screw 86 (FIGS. 3 and 4) is threaded through a boss 87 in the link 76 and engages a bolt on angle member 68 to limit the downward movement of the fruit trimmer 11. It will also be noted that the link 76 includes a camming portion 76a which projects forwardly, i.e., to the left (FIG. 4), of the pin 78.

A tomato hold-down cup 91, having a central opening through which the blossom trimmer projects, is associated with each trimmer to engage the blossom end portion of the tomato and hold the same in centered position in its support cup 28 (FIG. 2). Each hold-down cup 91 is welded to a pair of spaced vertically extending arms 92 and 93 (FIG. 2) which are pivotally connected to two vertically spaced U-shaped arms 94 and 96 by pivot pins 97 and 98 (FIG. 3), respectively. The other ends of the arms 94 and 96 are pivotally mounted on the pins 78 and 79, respectively. Each cup 91 is washed with water which enters the cup through conduit 95 from a supply source (not shown). A roller 100 (FIG. 4) is journalled on the pin 97 and a stiffening channel 94a is integral with the arm 94 and serves to stiffen the same. As indicated in FIGS. 2 and 4, one branch of the U-shaped arm 94 extends forwardly of the pivot pin 78 and is connected to one end of a spring 99 which resiliently urges the cup 91 downwardly against the tomato. The other end of the spring 99 is connected to one of a plurality of parallel arms 101 (only one being shown in FIG. 1). The arms 101 are welded to a tube 102 (FIGS. 2 and 8) which is mounted on the shaft 38.

In order to adjust the tension of the springs 99, a tab 103 (FIG. 8) is welded to the upper surface of the tube 102 and projects upwardly, therefrom, in alignment with spaced tabs 104 extending from a split block 106 which is rigidly clamped on the shaft 38. Set screws 107, threaded into and locked in adjusted position against the tabs 104, contact the tab 103 thereby providing means for adjusting the tube 102 relative to the shaft 38 and for locking the tube in adjusted position.

One end of a spring 109 (FIG. 4) is connected between a finger 111 connected to and projecting upwardly from the link 76 radially of the pivot pin 78. The other end of the spring 109 is connected to a transverse pin 112 projecting outwardly from one branch of the adjacent U-shaped arm 94. It will be seen that the spring 109 serves to resiliently urge the link 76 to pivot clockwise relative to the pin 78 thereby urging the fruit trimmer 11 downwardly.

A disc cam 113 (FIGS. 1 and 2) is secured to the cam shaft 43 in order to raise the fruit trimmer 11 and the hold-down cup 91 when the trimming operation is completed on one tomato and the trimmer carrier 30 is to be moved in a direction opposite to the direction of movement of the tomato conveyor 26 to register with the next tomato. A cam follower 114 rides against the periphery of the cam 113 and is journalled between the sides of an L-shaped channel 116 which is pivotally connected to the frame of the machine by a stub shaft 117. A spring 118 is connected between an upwardly projecting portion of the L-shaped arm 116 and the horizontal bar 14 of the frame for urging the cam follower against the cam 113. A connecting rod 119 is pivotally connected between the arm 116 and a crank arm 121. The crank arm 121 is keyed to a laterally extnding shaft 122 which is journalled in bearings 123 and 124 that are bolted to the triangular end plates 31 and 32, respectively, of the reciprocable carrier 30. A plurality of parallel arms 126 (FIGS. 3 and 4) are welded to the shaft 122 and each arm has a roller 127 journalled thereon that is disposed in position to ride against one of the camming portions 76a of the links 76. The cam 113 is timed with the movement of the conveyor 26 and with the cam 46 so as to cause the fruit trimmer 11 and the hold-down cup 91 to raise above the level of tomatoes carried by the conveyor 26 prior to the return stroke of the reciprocable carrier 30.

The fruit trimmer 11 (FIGS. 5 and 6) comprises the previously mentioned body 83 which includes a rearwardly projecting boss 131 and which is bored to receive a drive shaft 132 (FIG. 6). The shaft 132, which has a large diameter upper end portion 133 provided with a key slot 134 and a central bore 136, is journalled in an upper bearing 137 and in a lower bearing 138. The upper bearing 137 is received in a counterbore 139 and is held from axial movement by a spacer ring 141 and a tubular housing 142 which is concentric with the counterbore 139 and is connected to the body 83 by screws 143. The lower bearing 138 is received in a counterbore 144 and is held against axial movement therein by a cutting head support 146 which is connected to the drive shaft 132 by a pin 147. A pair of ears 148 and 149 extend transversely from the support 146 and are bored and fitted with bushings 150 for rotatably receiving a cutting head shaft 151 for rotation about an axis which is disposed in a position parallel to and offset from the axis of the drive shaft 132. A pinion 152 and a collar 153 are secured to the cutting head shaft 151 by pins 154 and 156, respectively. The pinion 152 and the collar 153 engage the ears 148 and 149, respectively, to prevent axial movement of the cutting head shaft 151. An internal ring gear 157, which is concentric with the drive shaft 132, is locked in an annular recess 158 in the bottom of the body 83 by cap screws 159 and is engaged by the teeth of the pinion 152.

An internally threaded tubular cutter 161, having saw teeth 162 on its lower end, is carried by the lower end portion 151a of the cutting head shaft 151. The lower end portion 151a is reduced in diameter and is threaded to receive an internally and externally threaded cutter mounting cylinder 163 which is screwed onto the portion 151a and is locked against the full diameter portion of the shaft 151. The cylinder 163 is provided with a diametrical slot 164 adapted to receive a diametrically extending cutter 166 having a saw tooth lower edge 167. The tubular cutter 161 is screwed onto the cylinder 163 and both cutters 161 and 166 are locked to the cutter mounting cylinder 163 by a set screw 168 (FIG. 5) which extends through an opening 169 in the tubular cutter 161 and is screwed into a threaded hole in the cylinder 163. The set screw 168 engages the diametrical cutter 166 to lock the same against a wall of the slot 164 and to cause the slotted cylinder 163 to expand causing the mating screw threads of the cylinder 163 to lock with the internal threads of the cutter 161.

In order to determine the depth to which the cutters 161 and 166 enter the blossom end of the tomato, a crescent shaped depth gauge 171 partially encompasses the cutter 161 and presents a flat gauging surface 172 to the blossom end portion. The gauge has an opening disposed radially outwardly of the drive shaft 132 for providing a discharge passage for discharging severed particles of the tomato. The crescent shaped gauge 171 is welded to a vertically extending arm 173 which is connected to the cutter head support 146 by cap screws 174 which extend through vertically elongated depth adjustment slots 176 in the arm 173. The gauge 171 thus rotates with the cutter in an orbital path to contact surfaces surrounding the trimmed portion of the fruit. Normally, the depth of cut is approximately 1/32 of an inch.

The several fruit trimmers 11 in the fruit processing apparatus 10 are driven by a motor 178 (FIG. 1) through a transmission 179 and a plurality of flexible drive cables 181. Each drive cable 181 is connected to one of the fruit trimmers 11 by a key 182 (FIG. 6) which is received in the slot 134 of the enlarged end portion 133 of the drive shaft 132 and in a keyway 183 in a spindle 184 that extends into the bore 136. The spindle 184 is secured in any well known manner to the rotary element 181a of the cable 181. A collar 186 on the spindle 184 rides within an apertured cap 187 which is connected to the stationary element 181b of the cable 181 and is screwed onto the upper end of the housing 142. The collar 186 prevents accidental disengagement of the spindle 184 from the drive shaft 132.

The drive shaft 132 is driven at approximately 450 revolutions per minute about its axis C as indicated by the circular line 132a (FIG. 7) and in the direction indicated by the arrow thereon. The ratio between the rotary speed of the drive shaft 132 and that of the cutter shaft 151 is approximately 1 to 1.8. Therefore, the shaft 151 and cutters 161 and 166 carried thereby are driven at approximately 800 revolutions per minute about the axis of shaft 151 as indicated by the circular path 161a which illustrates an instantaneous position of the cutter 161 as it orbits about the axis C of the drive shaft 132. The outer portion of the rotating and orbiting cutter 161 defines a path 189 which encloses a relatively large area of the blossom end of the tomato.

In the operation of the fruit processing apparatus 10, the conveyor 26 (FIG. 1), with tomatoes in the cups 28, is driven in the direction of the arrow A and the cam shaft 43 is driven in timed relation therewith. The cam 46 (FIG. 2) acting through the cam follower 47 and arms 52 and 53 causes the carrier 30 to reciprocate toward and away from the discharge end of the conveyor 26. During movement toward the discharge end, each blossom trimmer 11 and its hold-down cup 91 becomes aligned with and moves at the same speed as the tomato support cup 28 at which time the blossom end of the tomato is trimmed. As this trimming portion of the movement begins, the spring 118 cooperates with the disc cam 113 (FIG. 1) which acts through the follower 114, the arm 116, the connecting rod 119, and the crank arm 121, to cause the shaft 122 to rotate in a clockwise direction. The several rollers 127 are moved away from the associated camming portions 76a of the link 76 causing the several fruit trimmers 11 and hold-down cups 91 to lower onto the tomatoes centered therebelow. The spring 99 resiliently urges its associated cup 91 firmly down upon the tomato and likewise the spring 109 resiliently urges the blossom trimmer 11 down upon the fruit but with a force which is less than that of the cup 91.

It will be noted that, as the carrier 30 (FIG. 1) approaches the end of its trimming stroke, which stroke requires only about 0.4 second, the shaft 38, tube 102 (FIG. 8) and arms 101 to which the springs 99 (FIG. 1) are connected, rotate in a counterclockwise direction thereby increasing the tension on the springs 99 to urge the hold-down cups 91 more firmly against the tomatoes.

Upon reaching the end of the trimming stroke and while the carrier 30 is still moving in the same direction as that of the conveyor 26, the disc cam 113 causes the rollers 127 to lower against the camming portion 76a of the link 76 thereby raising the fruit trimmers 11 from the tomatoes. As the fruit trimmers 11 move upwardly away from the tomato, the boss 131 contacts the roller 100 on the pin 97 (FIG. 4) and raises the hold-down cup 91 to a position above the level of the fruit. The carrier 30 then reverses its direction of movement so as to align the fruit trimmers 11 with fruit in the cups 28 in the flight 27 next behind. The above described operation is then repeated for each flight in turn.

As mentioned previously, the fruit trimmer 11 is provided to cut the darkened blossom end portion and skin adjacent thereto from the tomato. The tomatoes are centered relative to their supporting cups 28, however, the blossom scar is not always symmetrical with the tomato and therefore it is desirable that the cutters 161 and 166 cover a relatively large area to insure removal of this portion of the fruit. This is readily accomplished by the fruit trimming apparatus 10 of the present invention since the cutters 161 and 166, act on all portions of the tomato enclosed by the path 189 (FIG. 7). It will also be noted from FIG. 7 that the center of the tomato and the axis of rotation of the shaft 132 indicated at C, lie near and inside the periphery of the path of movement 161a of the cutter 161. Thus, the linear speed of the diametrical cutter 166 is quite rapid as it passes the point C assuring that this point, as well as all other points within the path 189, will be completely trimmed.

The crescent shape of the depth gauge 171 (FIG. 5) allows cut particles from the stem end of the tomato to be flung by centrifugal force free from the blossom trimmer 11. Water entering the cup 91 is provided to aid this cleaning operation.

From the foregoing description it is apparent that the fruit trimmer of the present invention is self-cleaning in that it is driven at a speed rapid enough to allow centrifugal force to dislodge all particles tending to adhere thereto. The double action eccentric rotation of the cutter assures that both cutters move rapidly past all points within the cutting path thereby assuring complete trimming of the blossom end of the tomatoes.

The present invention also discloses an improved mechanism for moving the fruit trimmers into register with the tomatoes and for progressively increasing the resilient force acting on the hold-down cups and on the fruit trimmers as the trimmers move through their cutting strokes.

While one embodiment of the present invention has been shown and described, it will be understood that various changes and modifications may be made without departing from the spirit of the invention or the scope of the appended claims.

Having thus described the present invention and the manner in which the same is to be used, what is claimed as new and desired to protect by Letters Patent is:

1. In a mechanism for trimming fruit, the combination of a body having one end formed with axially projecting teeth, a cutter shaft for supporting the other end of said body, a drive shaft disposed substantially parallel to and spaced from said cutter shaft, means for continuously rotating said drive shaft, and means interconnecting said drive shaft with said cutter shaft to effect orbital movement of said body about the axis of said drive shaft and to effect rotation of said body about the axis of said cutter shaft, the radius of the circular cutting path defined by the teeth as they rotate about said cutter shaft being greater than the distance between said two shafts.

2. In a mechanism for trimming fruit, the combination of a cutter having a first saw toothed cutting edge extending in a circle and a second saw toothed substantially continuous cutting edge extending across the center of said circle and between diametrically opposite points on said circle, a cutter shaft rigidly secured to said cutter, a drive shaft disposed parallel to and spaced from said cutter, means for continuously rotating said drive shaft, and means interconnecting said drive shaft with said cutter shaft to effect orbital movement of said cutter about the axis of said drive shaft and to effect rotation of said cutter about the axis of said cutter shaft, the radius of the circular cutting path defined by the teeth as they rotate about said cutter shaft being greater than the distance between said two shafts.

3. In a mechanism for trimming fruit, the combination of a cutter having a saw tooth cutting edge, a cutter shaft for supporting said cutter, a drive shaft disposed parallel to and spaced from said cutter shaft, means for continuously rotating said drive shaft, means interconnecting said drive shaft with said cutter shaft to effect orbital movement of said cutter about the axis of said drive shaft and to effect rotation of said cutter in a circular path about the axis of said cutter shaft, and a crescent shaped depth gauge carried by said interconnecting means for movement with said cutters in said orbital path, said crescent shaped gauge partially surrounding said cutter and defining an opening at the intersection of the oribital path with said circular path to permit free passage of debris dislodged by centrifugal force from said cutter.

4. In a mechanism for trimming fruit, the combination of a support, a drive shaft journalled in said support, drive means secured to one end of said shaft for rotating said shaft, a ring gear secured to one end of said support and concentric with said shaft, a cutter support secured to said drive shaft for rotation therewith, a cutter shaft journalled in said cutter support and disposed parallel to and offset from said drive shaft, a pinion secured to said cutter shaft and received in meshing engagement with said ring gear for rotating said cutter shaft at a speed in excess of the speed of said drive shaft, a tubular cutter secured to said cutter shaft, and a second cutter secured to said tubular cutter and extending diametrically across said tubular cutter.

5. In a mechanism for trimming fruit, the combination of a cutter body, a drive shaft journalled in said body, drive means for rotating said shaft, a ring gear secured to one end of said body and concentric with said shaft, support means secured to said drive shaft for rotation therewith, a cutter shaft journalled in said support means and being disposed parallel to and offset from said drive shaft, a toothed cutter secured to said cutter shaft, a pinion secured to said cutter shaft and received in meshing engagement with said ring gear for rotating said cutter about the axis of said cutter shaft and also in an orbital path about the axis of said drive shaft, and a crescent shaped depth gauge adjustably secured to said support means and defining an opening disposed radially outwardly of the axis of said drive shaft for providing a passage through which fruit particles may be discharged by centrifugal force.

6. A mechanism for trimming the blossom end from fruit comprising a continuously driven horizontally disposed conveyor for conveying the fruit along a predetermined path, a carrier mounted for reciprocable movement above said conveyor in a direction parallel to the path of movement of said conveyor, means connected to the carrier and timed with the movement of said conveyor to move the carrier at the same speed and in the same direction as the conveyor, a cutter body, a continuously driven cutter rotatably supported by said body, a first linkage pivotally connected to said body and to said carrier for supporting said body for vertical movement, a hold-down cup for receiving the cutter therein, a second linkage pivotally connecting said cup to said carrier, resilient means connected to said second linkage for urging said hold-down cup downwardly, second resilient means being connected between said first and said second linkages and arranged to urge said cutter body downwardly, and cam actuated means for simultaneously causing movement of said carrier at the same speed and in the same direction as the conveyor and causing downward movement of said cutter and said hold-down cup onto the fruit therebelow.

7. A mechanism for trimming fruit comprising a continuously driven horizontally disposed conveyor for conveying the fruit along a predetermined path, a carrier mounted for reciprocable movement above said conveyor in a direction parallel to the path of movement of said conveyor, means connected to said carrier and timed with the movement of said conveyor for reciprocating said carrier in a direction parallel to said predetermined path, a first pair of links pivotally connected to said carrier for vertical pivotal movement, a cutter body pivotally connected to said links, a continuously driven cutter rotatably supported by said body, a second pair of links pivotally supported for vertical movement by said carrier, a hold-down cup pivotally connected to said second links, resilient means interconnecting said first pair of links to said second pair of links for urging said cutter downwardly, second resilient means connected at one end to one of said second links for urging said hold-down cup downwardly, and means connected to said carrier and to the other end of said second resilient means and responsive to the reciprocable movement of said carrier to effect a tensioning of said second resilient means when said carrier is being moved in the same direction as the conveyor and to effect a release of tension when the carrier is moving in the opposite direction, and cam actuated means for causing movement of said carrier at the same speed and in the same direction as the conveyor and simultaneously therewith causing downward movement of said cutter and said hold-down cup onto the fruit therebelow.

8. A mechanism for trimming the blossom end from fruit comprising a frame, a horizontal continuously driven conveyor supported by said frame and arranged to convey fruit along a predetermined path, a pair of parallel shafts journalled on said frame and disposed above said conveyor, a tube journalled on one of said shafts, a finger projecting from said tube, means for locking said tube in adjusted position to said one shaft, a pair of spaced links secured to each shaft, a carrier pivotally supported by said links above said conveyor, means connected to the carrier and timed with the movement of said conveyor to move the carrier at the same speed and in the same direction as the conveyor, a cutter body, a continuously driven cutter rotatably supported by said body, a first linkage pivotally connected to said body and to said carrier for supporting said body for vertical movement, a hold-down cup for receiving the cutter therein, a second linkage pivotally connecting said hold-down cup to said carrier, first resilient means connected to said second linkage and to said finger for urging said hold-down cup downwardly, second resilient means connected between said first and said second linkages and arranged to urge said cutter body downwardly, and cam actuated means for simultaneously causing movement of said carrier at the same speed and in the same direction as the conveyor and causing downward movement of said cutter and said hold-down cup onto the fruit therebelow, said movement of said carrier in the direction of movement of said conveyor adapted to rotate said one shaft and said fingers in a direction to effect increased tension on said first resilient means.

9. An apparatus for trimming fruit comprising a reciprocable support, a parallel motion mechanism secured to said support for maintaining said support in a predetermined orientation during reciprocation thereof, an input shaft mounted for rotation in said support, a carrier secured to said input shaft for rotation therewith, a ring gear secured to said support in concentric relation with the axis of said input shaft, an output shaft having a gear secured thereto and disposed in meshing engagement with said ring gear and located for rotation on said carrier about an axis parallel to and laterally spaced from the axis of said input shaft, a tubular cutting member fixed in concentric relation to said output shaft, and a planar cutting member having the opposite ends secured to diametrically opposed portions on the interior surface of said tubular member.

10. In a mechanism for trimming a predetermined amount of flesh from the end of fruit wherein the trimming member is rotated about an axis that is in turn rotated about another axis the improvement comprising, an input shaft, an elongated carrier including longitudinally spaced transversely extending projections, an output shaft rotatably mounted through axially aligned bores formed in said projections, said carrier being secured to said input shaft so that the axes of said input and said output shafts are parallel and transversely spaced, means drivingly connecting said shafts for simultaneous rotation, a tubular member having one end secured to said output shaft with the axis thereof coincident with the axis of said output shaft, said tubular member having axially projecting saw-like teeth formed on the other end thereof and a flat plate extending diametrically across the interior of said tubular member, said plate including saw-like teeth projecting axially and being coplanar with said first mentioned saw-like teeth, and a crescent shaped plate adjustably secured to said carrier and partially surrounding said tubular member and operable to limit the amount of flesh removed from the stem end of the fruit.

References Cited by the Examiner

UNITED STATES PATENTS

| | | | |
|---|---|---|---|
| 1,595,953 | 8/26 | Leavitt | 146—52 |
| 1,605,677 | 11/26 | McCarthy | 146—52 |
| 2,297,158 | 9/42 | McDonald | 146—106 |
| 2,414,493 | 1/47 | Urschel et al. | 146—52 |
| 2,475,142 | 7/49 | Kane | 146—52 |
| 2,649,878 | 8/53 | Coons | 146—52 |
| 2,831,518 | 4/58 | Buck | 146—52 |
| 2,862,534 | 12/58 | MacDougall | 146—7 |

J. SPENCER OVERHOLSER, *Primary Examiner.*

LAURENCE V. EFNER, LOUIS J. CAPOZI,
*Examiners.*